United States Patent
Sharma et al.

(10) Patent No.: US 11,148,377 B1
(45) Date of Patent: Oct. 19, 2021

(54) CASTING WITH DEFORMABLE MOLDS

(71) Applicant: Facebook Technologies, LLC, Menlo Park, CA (US)

(72) Inventors: Robin Sharma, Redmond, WA (US); Andrew John Ouderkirk, Redmond, WA (US); Katherine Marie Smyth, Seattle, WA (US); Karol Constantine Hatzilias, Kenmore, WA (US); Kurt Allen Jenkins, Sammamish, WA (US); Christopher Yuan-Ting Liao, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/286,431

(22) Filed: Feb. 26, 2019

Related U.S. Application Data

(60) Provisional application No. 62/787,152, filed on Dec. 31, 2018.

(51) Int. Cl.
*B29D 11/00* (2006.01)

(52) U.S. Cl.
CPC .... *B29D 11/00951* (2013.01); *B29D 11/0048* (2013.01); *B29D 11/00442* (2013.01)

(58) Field of Classification Search
CPC ......... B29D 11/00951; B29D 11/0048; B29D 11/00442
See application file for complete search history.

(56) References Cited

U.S. PATENT DOCUMENTS

| | | | | |
|---|---|---|---|---|
| 5,028,358 A | * | 7/1991 | Blum | B29C 35/04 264/1.32 |
| 6,830,712 B1 | * | 12/2004 | Roffman | B29D 11/00125 249/82 |
| 7,264,755 B2 | * | 9/2007 | Griffith | B29C 33/0011 264/1.1 |

OTHER PUBLICATIONS

Madec, Overview of Deformable Mirror Technologies for Adaptive Optics and Astronomy, Adaptive Optics Systems III (2012), SPIE vol. 8447.

* cited by examiner

*Primary Examiner* — Mathieu D Vargot
(74) *Attorney, Agent, or Firm* — Freestone IP Law, PLLC; Aaron J. Visbeek; William J. Pigott

(57) ABSTRACT

A curable liquid is provided to a mold having a rigid surface disposed opposite a deformable surface. The curable liquid contacts the rigid surface and the deformable surface. The deformable surface is shaped according to a surface profile by driving actuators configured to move the deformable surface. The curable liquid is cured while the deformable surface is shaped according to the surface profile.

20 Claims, 21 Drawing Sheets

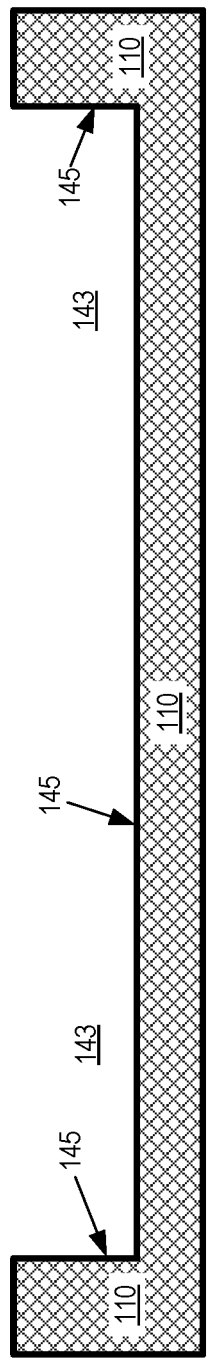
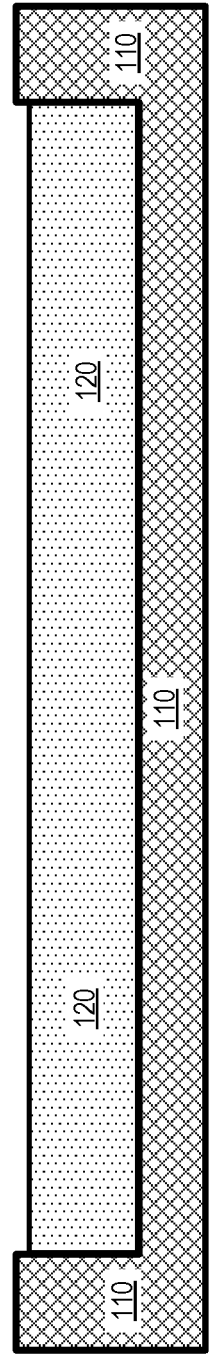
FIG. 1A
FIG. 1B

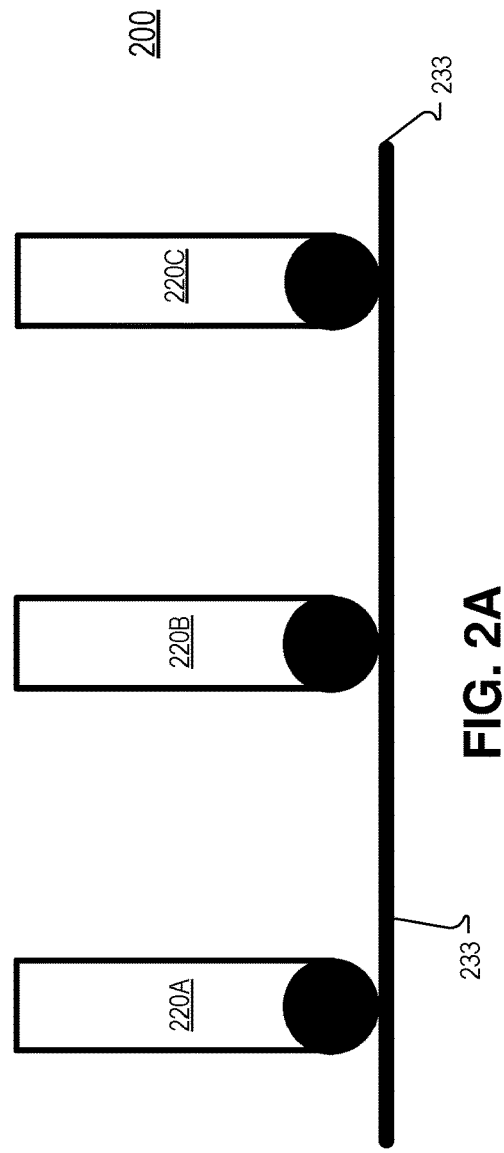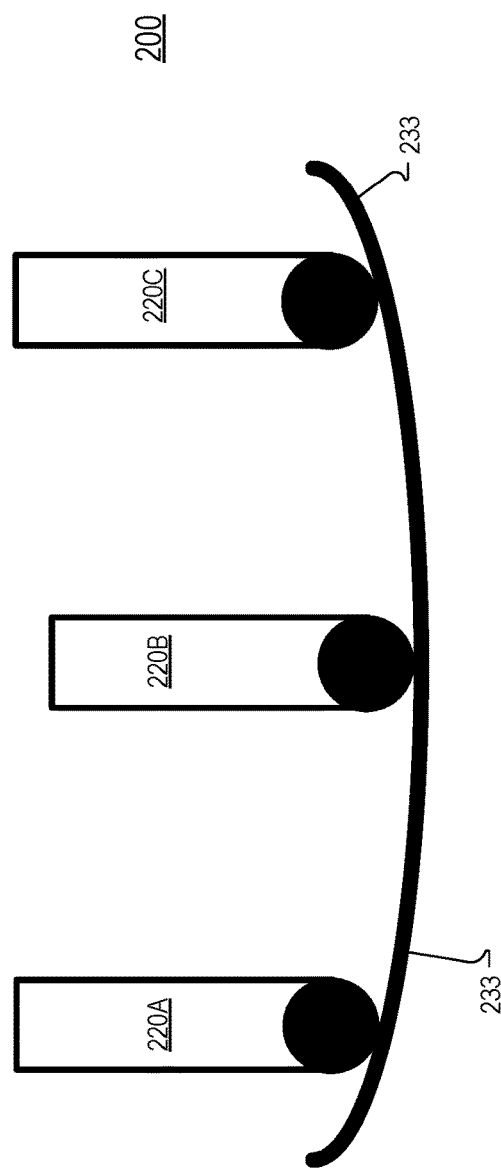

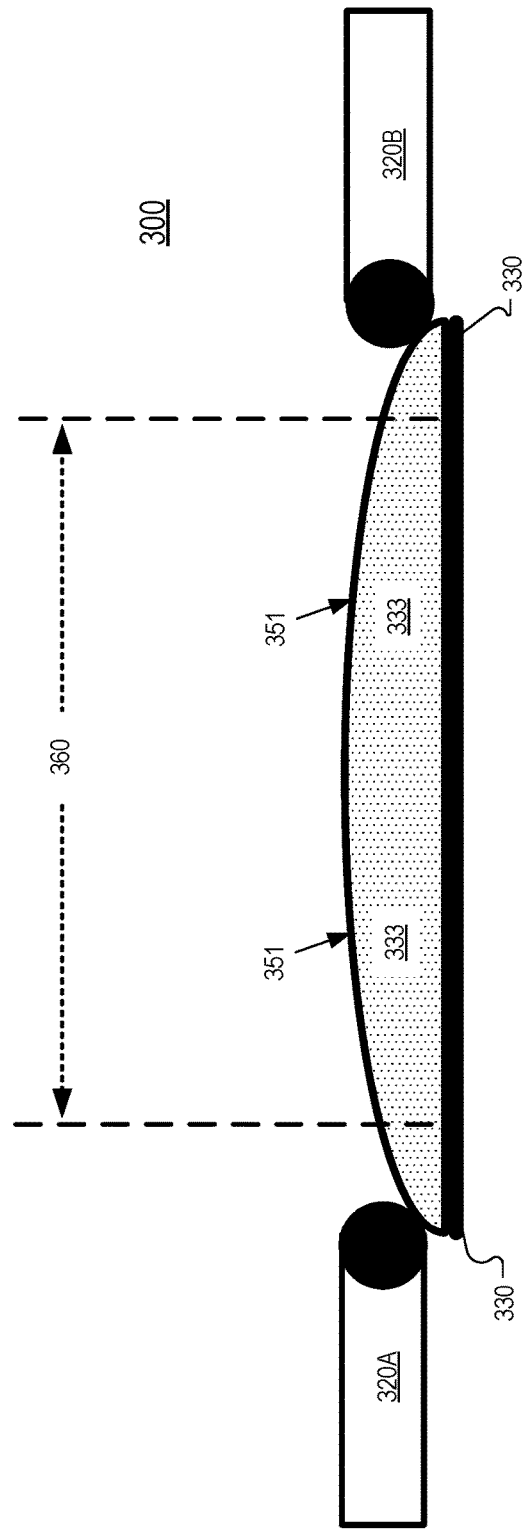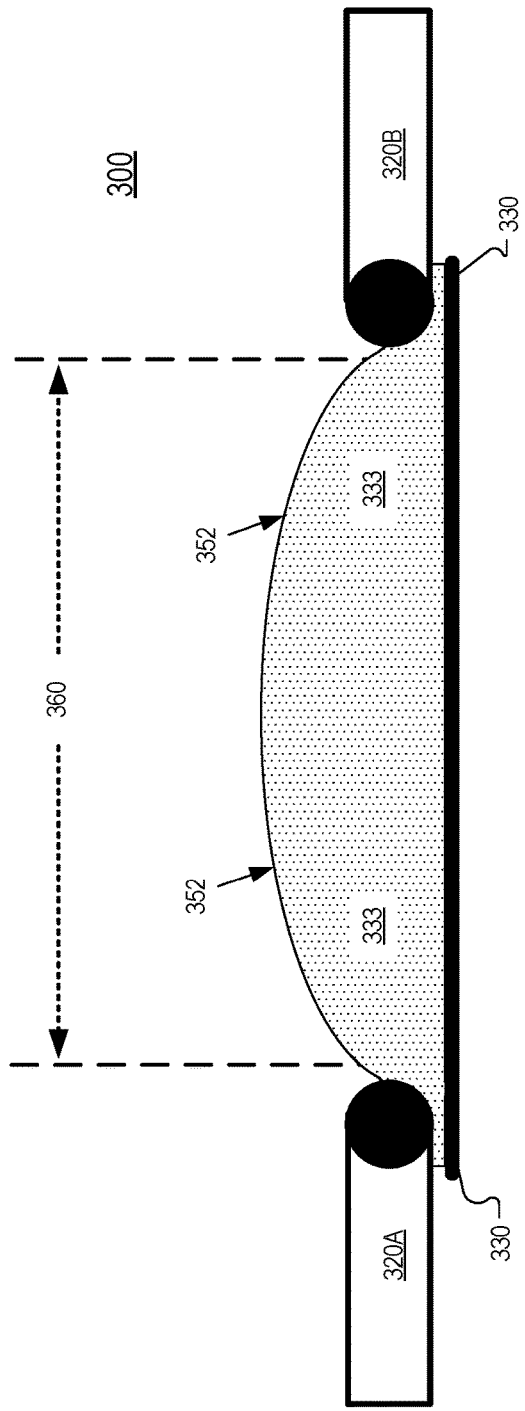

CASTING WITH DEFORMABLE MOLDS

CROSS REFERENCE TO RELATED APPLICATIONS

This application claims priority to U.S. provisional Application No. 62/787,152 filed Dec. 31, 2018 and entitled "Casting with Deformable Molds," which is hereby incorporated by reference.

TECHNICAL FIELD

This disclosure relates generally to casting and in particular to fabricating optical elements with deformable molds.

BACKGROUND INFORMATION

Prescription lenses have been in use since the 14$^{th}$ century. The most common correction provided by prescription lenses are for spherical, astigmatism, and prism. To fabricate a prescription lens, a blank lens is often chosen based on the spherical and astigmatic correction prescribed. Then, the profile of the surface that is facing towards the eye (back curvature) is customized based on the user's prescription. The profile of the back curvature may be formed by a subtractive process such as polishing or diamond turning. In the context of head mounted displays (HMDs), it may be advantageous to include a prescription lens in an optical stack that includes other optical elements. Furthermore, the cost of existing fabrication techniques may be cost prohibitive for certain applications.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

FIGS. 1A-1G illustrate fabricating an optical element with a mold and a deformable surface, in accordance with an embodiment of the disclosure.

FIGS. 2A-2C illustrate an example deformable mirror configuration that may be used as deformable surface unit, in accordance with an embodiment of the disclosure.

FIGS. 3A-3C illustrate an example liquid lens configuration that may be used as a deformable surface unit, in accordance with an embodiment of the disclosure.

DETAILED DESCRIPTION

Embodiments of a system and method of casting with deformable molds are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments of the disclosure include an apparatus, system, and method for casting parts such as optical elements with deformable molds. A curable liquid (e.g. a resin) may be provided to mold that has a rigid surface and a deformable surface. Actuators that are coupled to the deformable surface can be driven according to a selected surface profile that corresponds to a user's prescription so that when the curable liquid is cured, the optical element includes the user's prescription.

The rigid surface of the mold may be transparent such that ultraviolet (UV) radiation can propagate through the rigid surface to the curable liquid to activate or accelerate curing of the curable liquid. Curing of the curable liquid may also be activated or accelerated by heat.

In some embodiments, a closed-loop system adjusts the actuators that control the shape of the deformable surface based on imaging the deformable surface directly or light reflecting off or transmitting through the deformable surface. For example, when the rigid surface is transparent, the deformable surface may be illuminated with illumination light (e.g. infrared light). A Shack-Hartmann type wavefront sensor (including a lenslet array and a camera) may then receive the reflection of the illumination light from the deformable surface. Image data captured from the camera may be analyzed for both the intensity and the positions of the focused beams to characterize the shape of the deformable surface. The image data may be compared to calibration data associated with the selected surface profile that was selected. Based on that comparison, the actuators coupled to the deformable surface may be adjusted. These and other embodiments are described below with respect to FIGS. 1A-7.

Figure 1C:
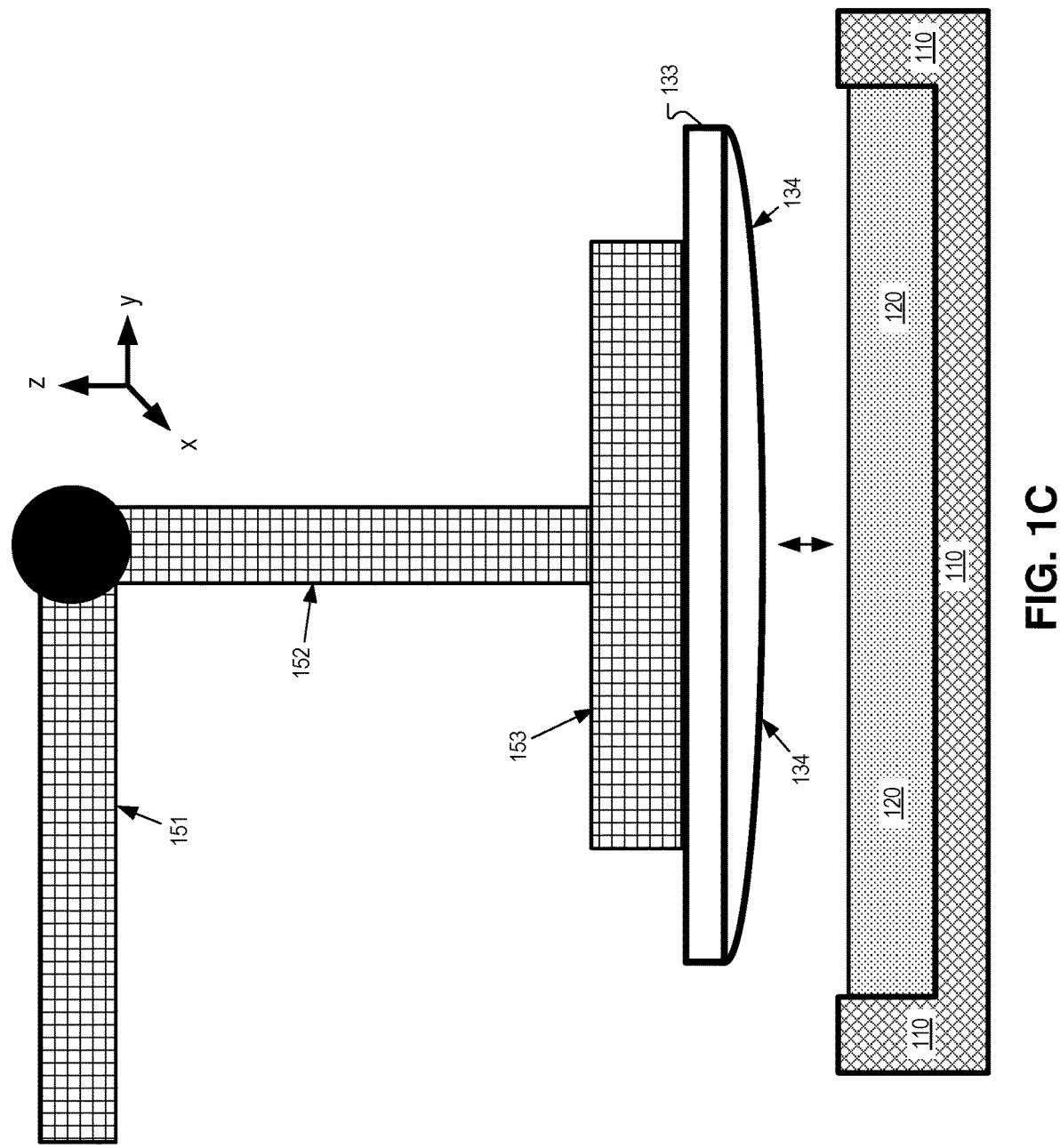

FIGS. 1A-1F illustrate fabricating an optical element with a mold and a deformable surface, in accordance with an embodiment of the disclosure. FIG. 1A illustrates a side view of rigid portion 110 of a mold that includes a void 143. Rigid portion 110 includes a rigid surface 145. Rigid surface 145 may be planar or may be a two-dimensional curvature. The rigid portion 110 of the mold may be optically transparent to UV, visible, and/or infrared light. For the purposes of this disclosure, UV light is defined as light having a wavelength of 200 nm to approximately 400 nm, visible light is defined as light having a wavelength of approximately 400 nm to approximately 750 nm, and infrared light is defined as light having a wavelength from approximately 750 nm to approximately 2500 nm.

FIG. 1B shows a curable liquid 120 being provided to the rigid portion 110 of the mold and contacting the rigid surface 145. Curable liquid may be poured or injected, for example.

Curable liquid 120 may be a resin or curable polymer, in some embodiments. Curable liquid is in a non-solid state when it is provided to rigid portion 110.

FIG. 1C illustrates a stage having extensions 151, 152, and platform 153. A deformable surface unit 133 is coupled to the platform 153 of the stage, in the illustrated embodiment. Deformable surface unit 133 includes a two-dimensional deformable surface 134 and actuators (not illustrated) that drive a selected surface profile onto the deformable surface 134. The stage may be moveable in dimensions x, y, and z so that the deformable surface 134 may be positioned correctly to be lowered into curable liquid 120.

Figure 1D:
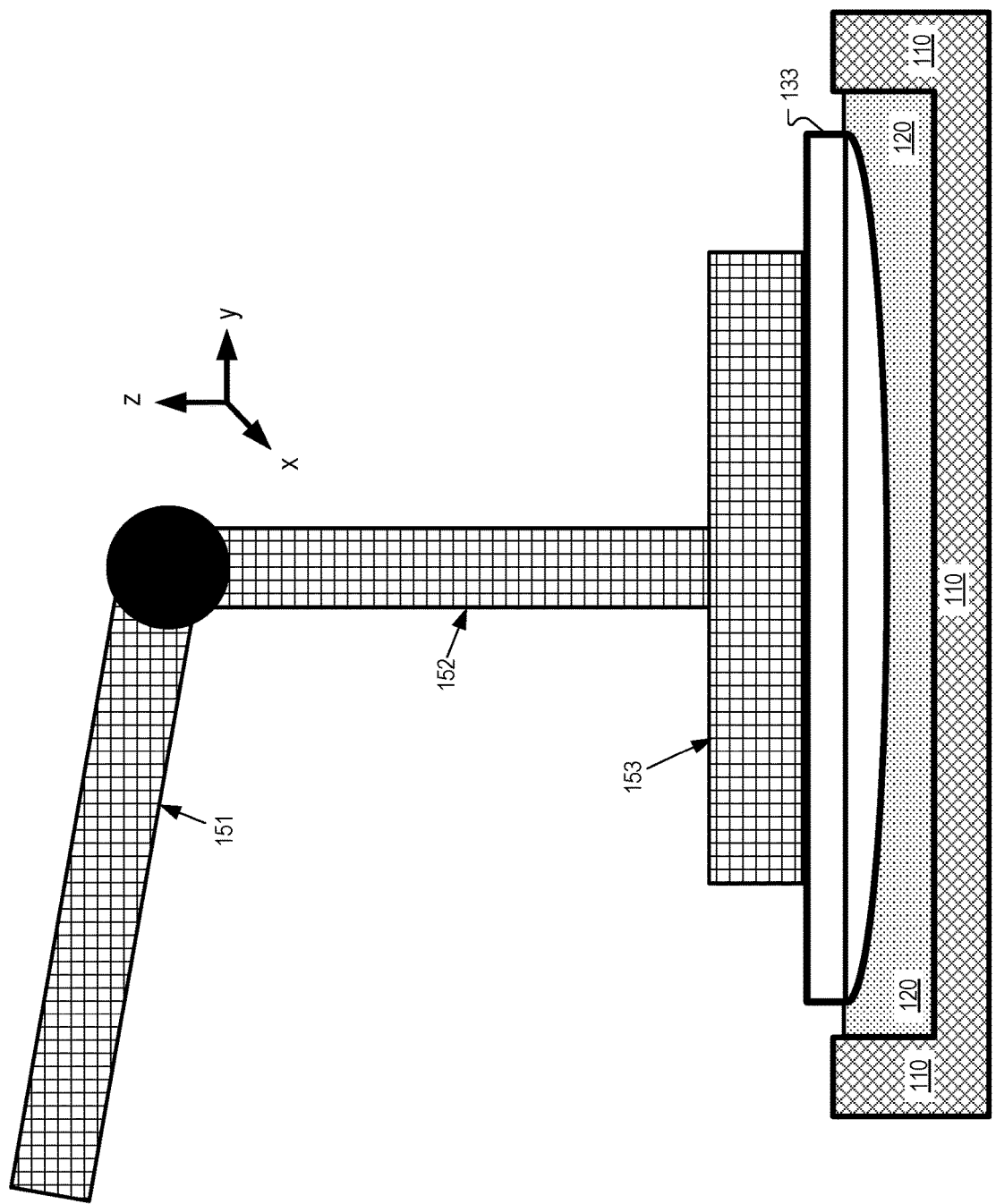
Figure 1E:
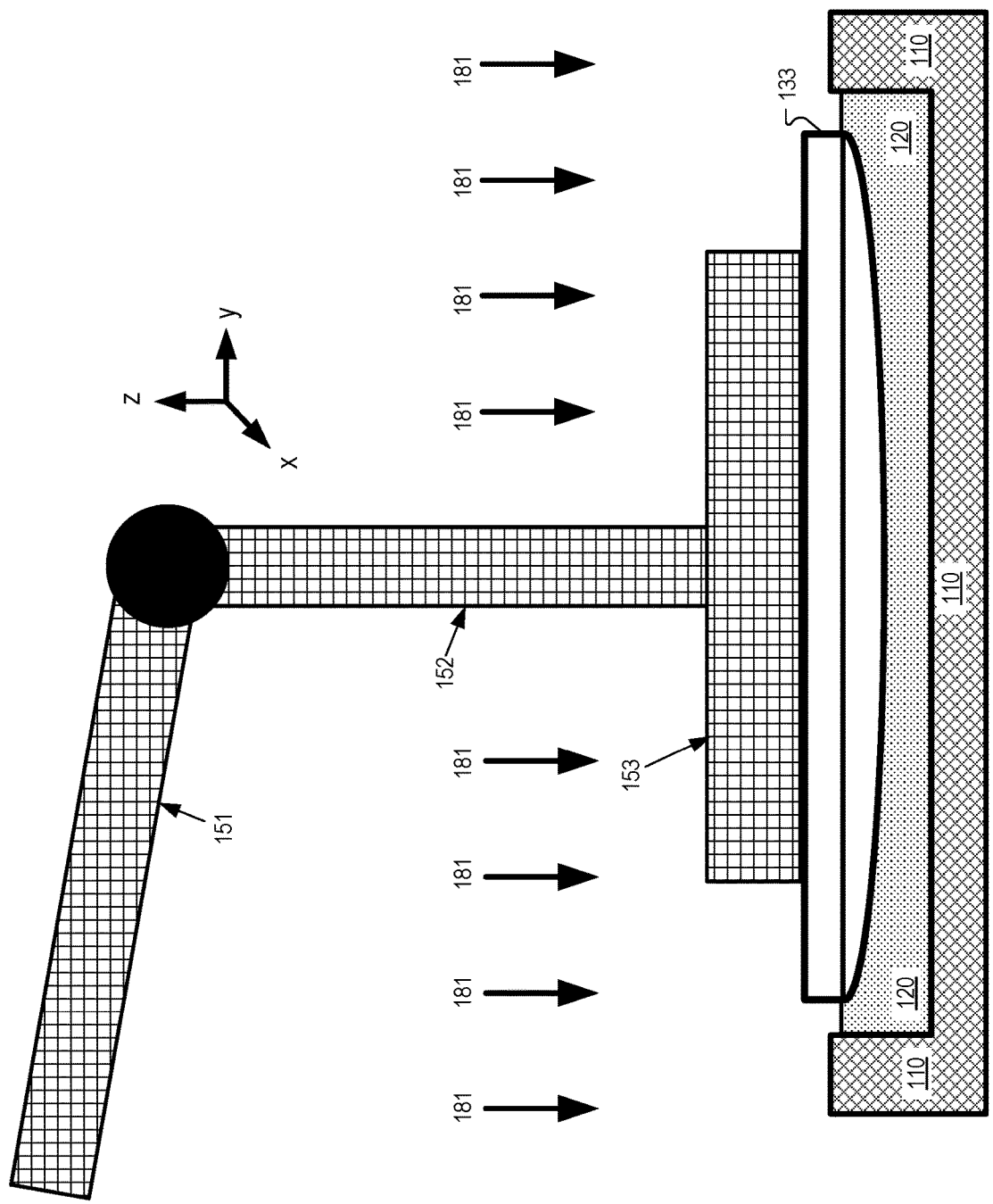
Figure 1F:
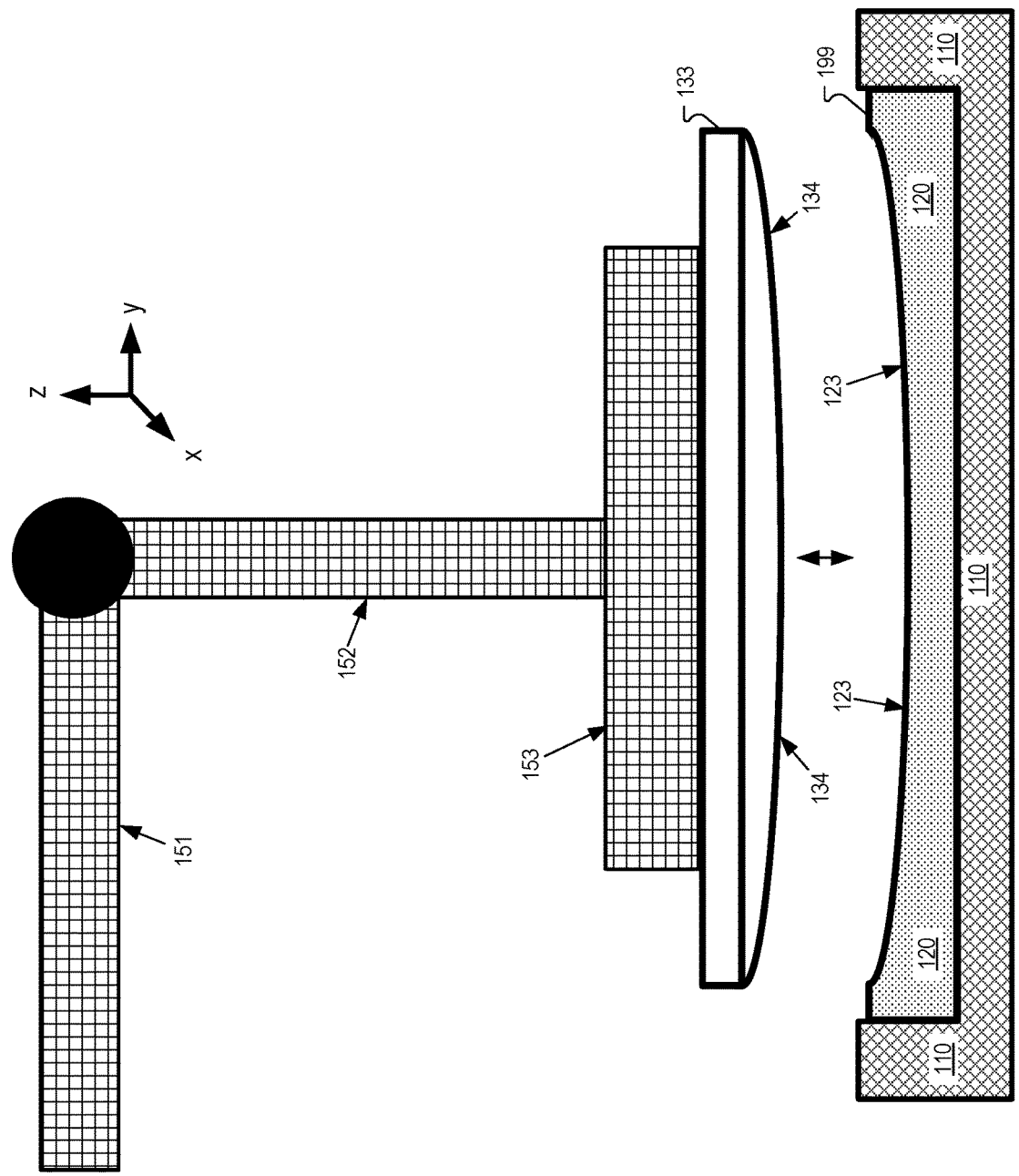

In FIG. 1D, the actuators of the deformable surface unit 133 are driven to a selected surface profile and the stage has been moved to imprint the deformable surface 134 into curable liquid 120. Together, deformable surface 134 disposed opposite of rigid portion 110 form a mold. In FIG. 1E, curable liquid 120 is exposed to radiation 181 (e.g. heat and/or UV light) to activate or accelerate the curing of curable liquid 120 into a non-liquid optical part while the deformable surface 134 is shaped according to the selected surface profile. After curable liquid 120 has been sufficiently cured, the stage moves to remove the deformable surface 134 from newly fabricated optical element 199.

Figure 1G:
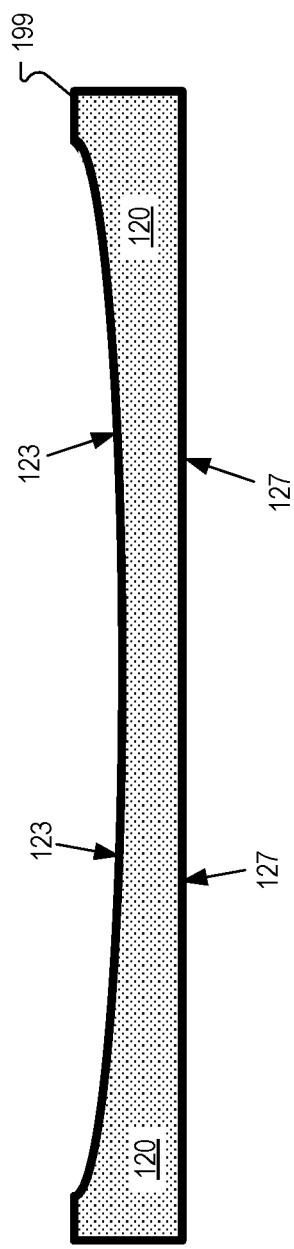

FIG. 1G illustrates the optical element 199 removed from the rigid portion 110 of the mold. Rigid surface 145 may be coated with a non-stick layer with a low coefficient of friction (e.g. polytetrafluoroethene) so that optical element 199 can be removed more easily from rigid surface 145 of rigid portion 110. Deformable surface 134 may also be coated with a non-stick surface. In FIG. 1G, rigid optical element 199 includes a surface 127 defined by rigid surface 145 and a surface 123 defined by deformable surface 134.

Optical element 199 may be a prescriptive lens. Surface 127 may be similar to the base curve traditionally selected by an optometrist for prescription lens purposes and surface 123 may be similar to what is commonly referred to as the "back surface" which traditionally faces toward the eye while the base curve traditionally faces toward the external environment. In this way, optical element 199 may be used as a prescriptive lens for eyes of a user.

Figure 2C:
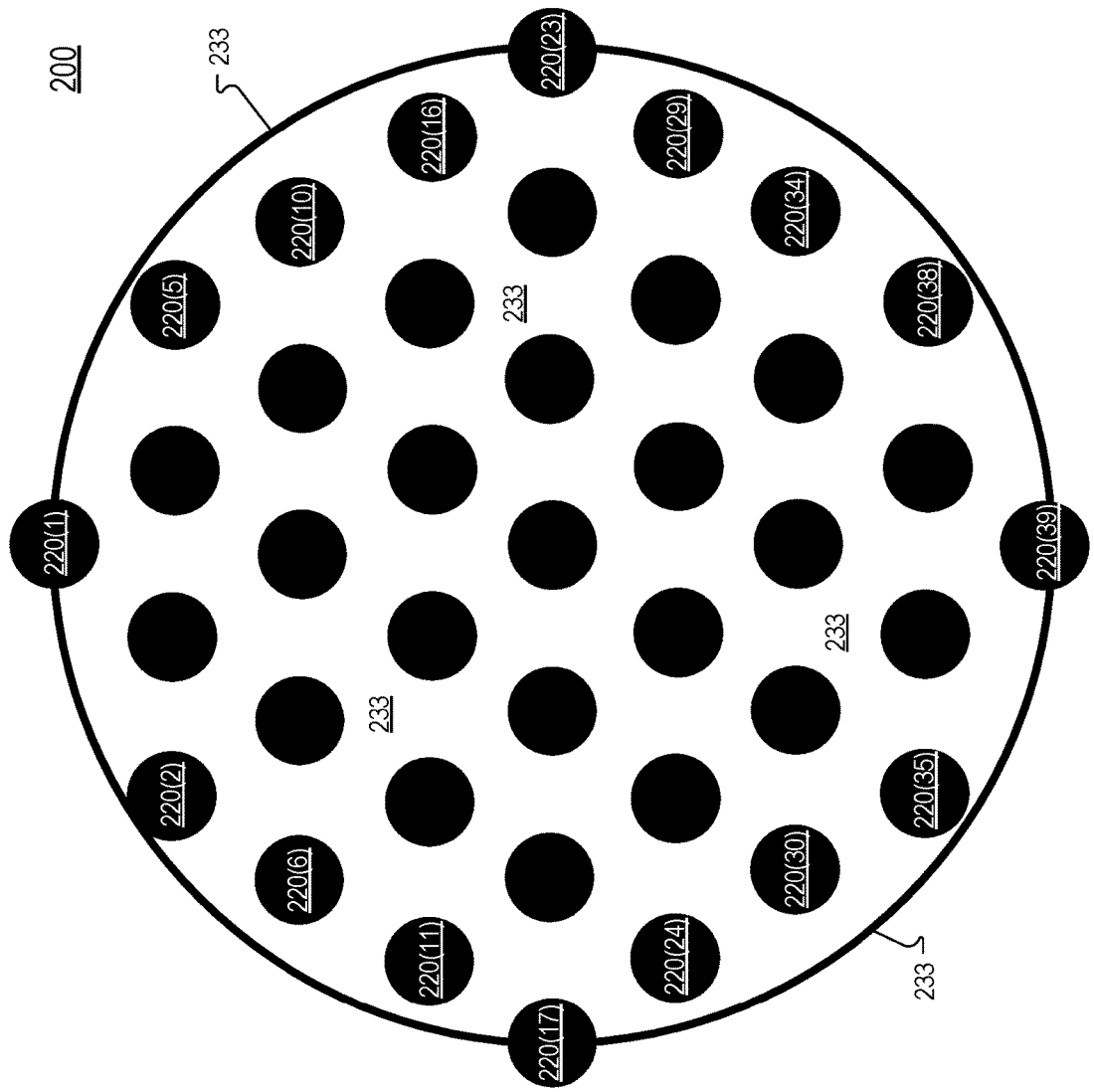

FIG. 2A-2C illustrate an example deformable mirror configuration that may be used as deformable surface unit 133, in accordance with an embodiment of the disclosure. In FIG. 2A, deformable mirror configuration 200 includes actuators 220A, 220B, and 220C coupled to selectively apply pressure to deformable membrane 233. Conventionally, a mirrored surface is disposed on deformable membrane 233 to make deformable membrane a deformable mirror.

In FIG. 2B, actuators 220A, 220B, and 220C are individually driven to impart a selected surface profile to deformable membrane 233. The actuators 220 may be piezoelectric actuators, electrostrictive actuators, or magnetic actuators, for example.

FIG. 2C illustrates a plan view of an example layout of actuators 220 with respect to deformable membrane 233. In the illustrated example, actuators 220(1)-220(39) are configured to physically push or pull deformable membrane 233 to drive the selected surface profile onto deformable membrane 233.

FIG. 3A illustrates an example fluid lens configuration that may be used as deformable surface unit 133, in accordance with an embodiment of the disclosure. In FIG. 3A, fluid lens configuration 300 includes actuators 320A and 320B coupled to selectively apply pressure to the edge of deformable membrane 333. Actuators 320 may be piezoelectric actuators, electrostrictive actuators, or magnetic actuators, for example. Deformable membrane 333 may be a transparent membrane filled with a transparent fluid. The fluid may be a gas or liquid. In FIG. 3A, the top of deformable membrane 333 has a surface 351 that may impart optical power to light passing through aperture 360. Recently, the size of the aperture of commercially available liquid lenses has increased and aperture 360 may be larger than 30 mm, for example. Deformable membrane 333 is disposed on a rigid transparent substrate 330, in FIG. 3A.

In FIG. 3B, actuators 320A and 320B are driven to impart a selected surface profile to deformable membrane 333 such that deformable membrane 333 has a surface 352. In FIG. 3B, actuators 320A and 320B are driven inward to press against the edges of deformable membrane 333. Surface 352 may impart a greater optical power to light propagating through aperture 360 than surface 351, for example.

Figure 3C:
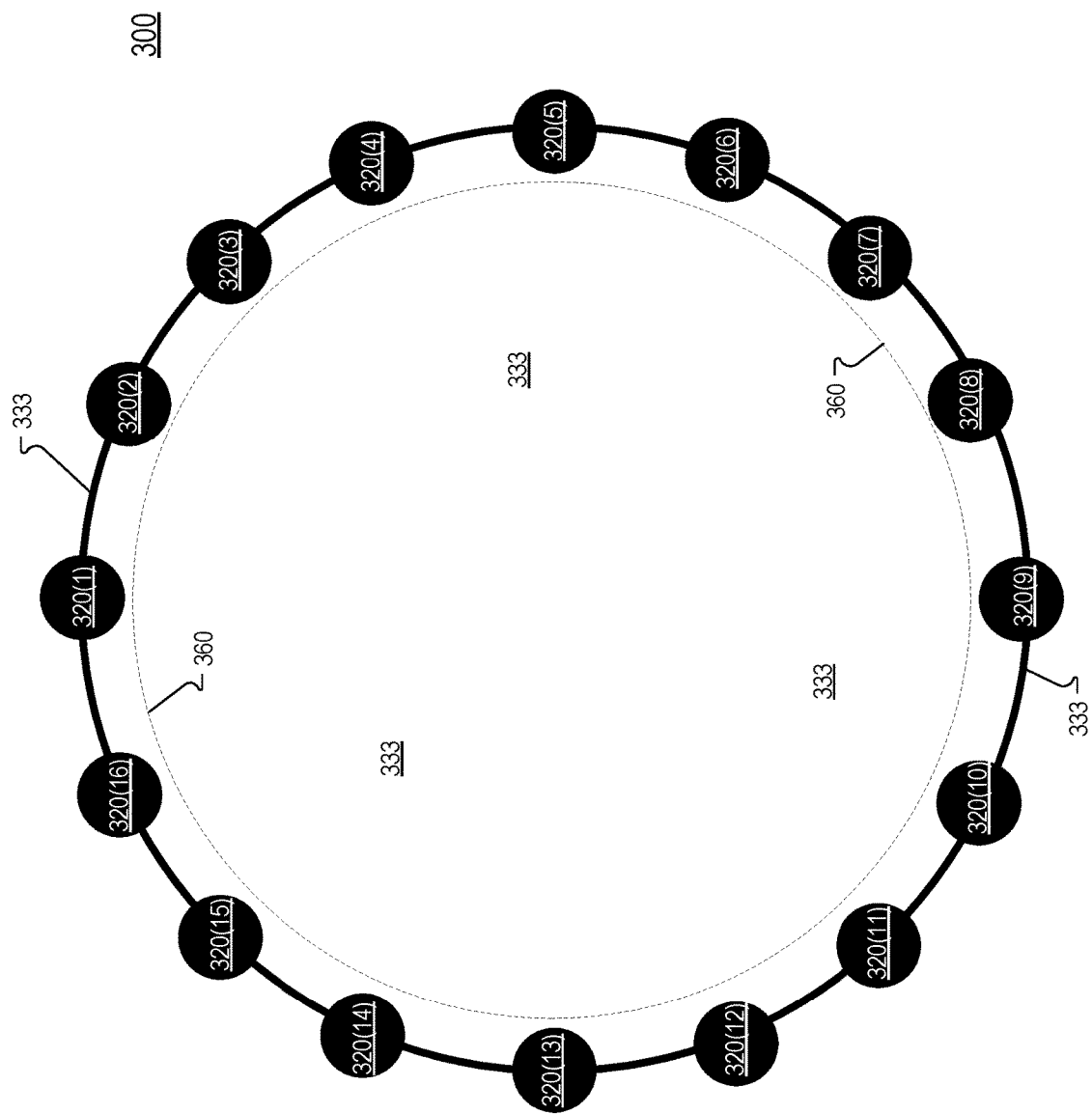

FIG. 3C illustrates a plan view of an example layout of actuators 320 with respect to deformable membrane 333. In the illustrated example, actuators 320(1)-320(16) are configured to push or withdraw from deformable membrane 333 along the edges to drive the selected surface profile onto deformable membrane 333.

When fluid lens configuration 300 is used in deformable surface unit 133, it may not be required to have the various elements be transparent since it may not be utilized for focusing light. Rather, shaping the deformable membrane 333 may be performed merely for imprinting a selected surface profile into the optical element 199.

Figure 4A:
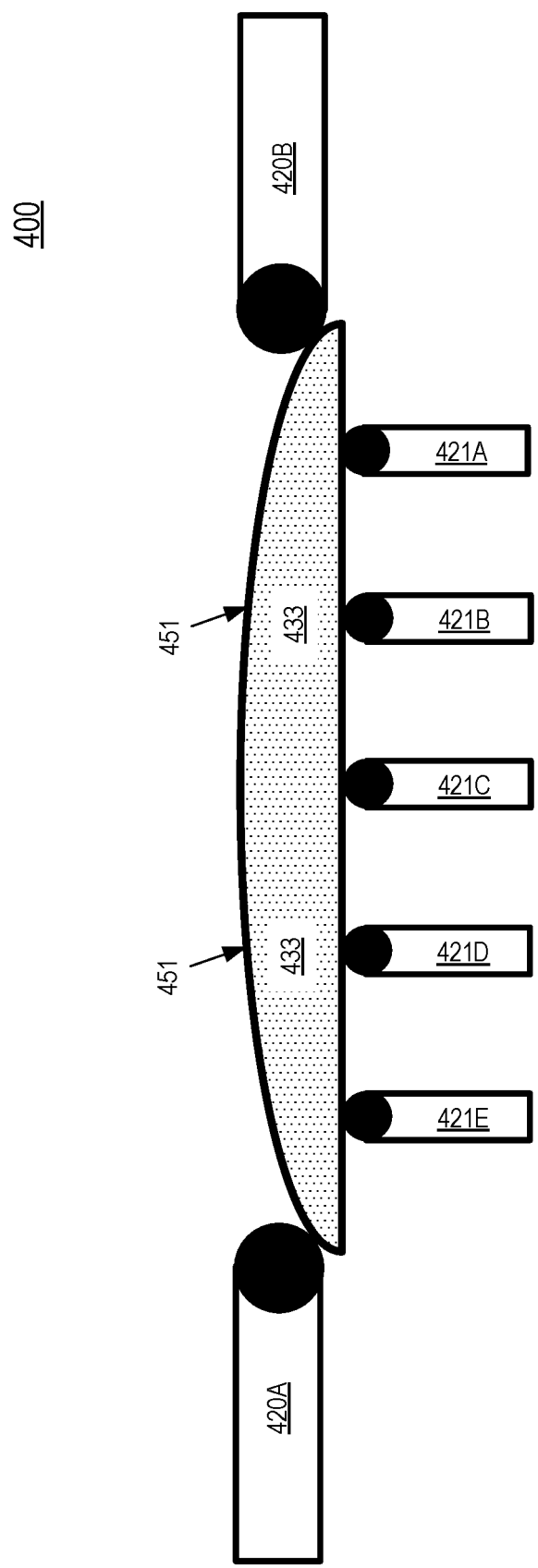
FIGS. 4A-4C illustrate a hybrid actuation configuration for imparting a selected surface profile onto a deformable membrane, in accordance with an embodiment of the disclosure.
Figure 4B:
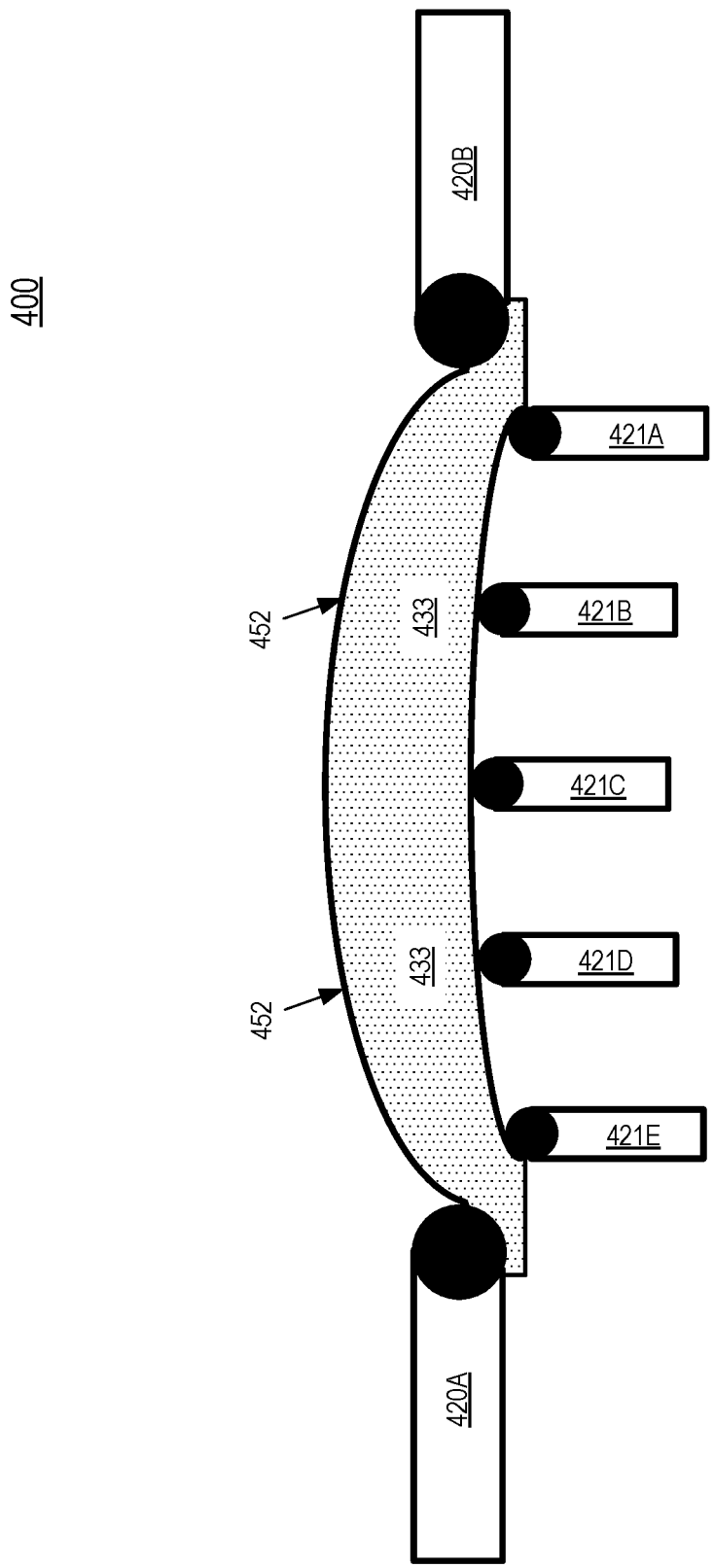
Figure 4C:
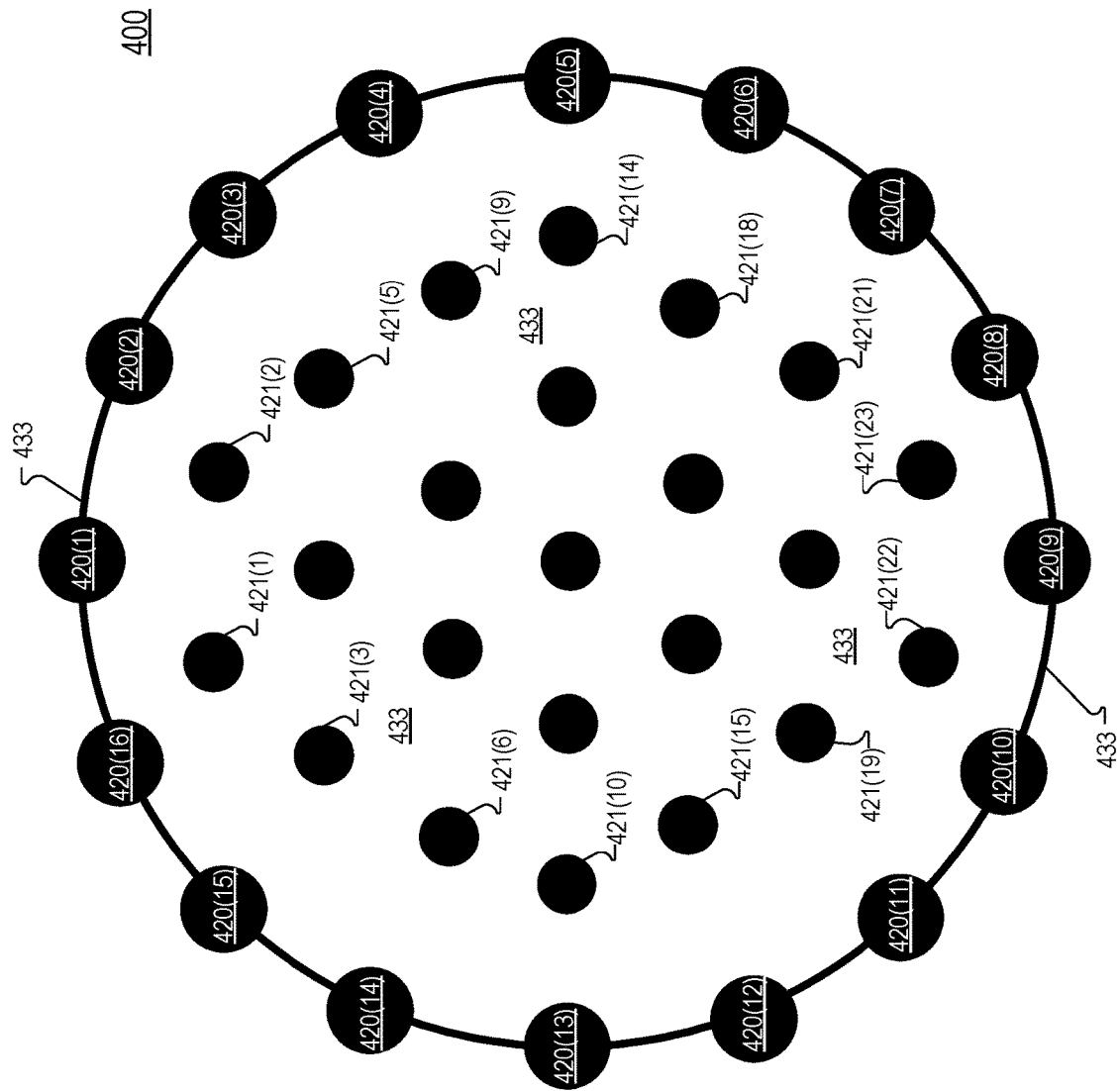

FIGS. 4A-4C illustrate a hybrid actuation configuration 400 for imparting a selected surface profile onto a deformable membrane 433. Hybrid actuation configuration 400 includes actuators 420A and 420B along the edges of deformable membrane 433 and actuators 421A-E supporting membrane 433 on the backside of deformable membrane 433. Actuators 420 along the edge may be driven to deploy low order coefficients of Zernike terms of a Zernike polynomial that defines a surface profile for imparting onto surface 451. Actuators 421 may be used to deploy coefficients of higher order Zernike terms of the Zernike polynomial to add resolution and the ability to impart freeform shapes to surface 451. Actuators 420 and 421 may be piezoelectric actuators, electrostrictive actuators, or magnetic actuators, for example.

FIG. 4B shows that actuators 420 and 421 are driven to impart surface 452 onto deformable membrane 433. Each actuator 420 and 421 may be configured to be driven individually in response to a digital or analog driving signal received by the actuator.

FIG. 4C illustrates a plan view of an example layout of actuators 420 and actuators 421 with respect to deformable membrane 433. In the illustrated example, actuators 420(1)-420(16) are configured to push or withdraw from deformable membrane 433 along the edges to drive the selected surface profile onto deformable membrane 433 and actuators 421(1)-421(23) are configured to push or withdraw from deformable membrane 433 on the backside of the deformable membrane.

Figure 5A:
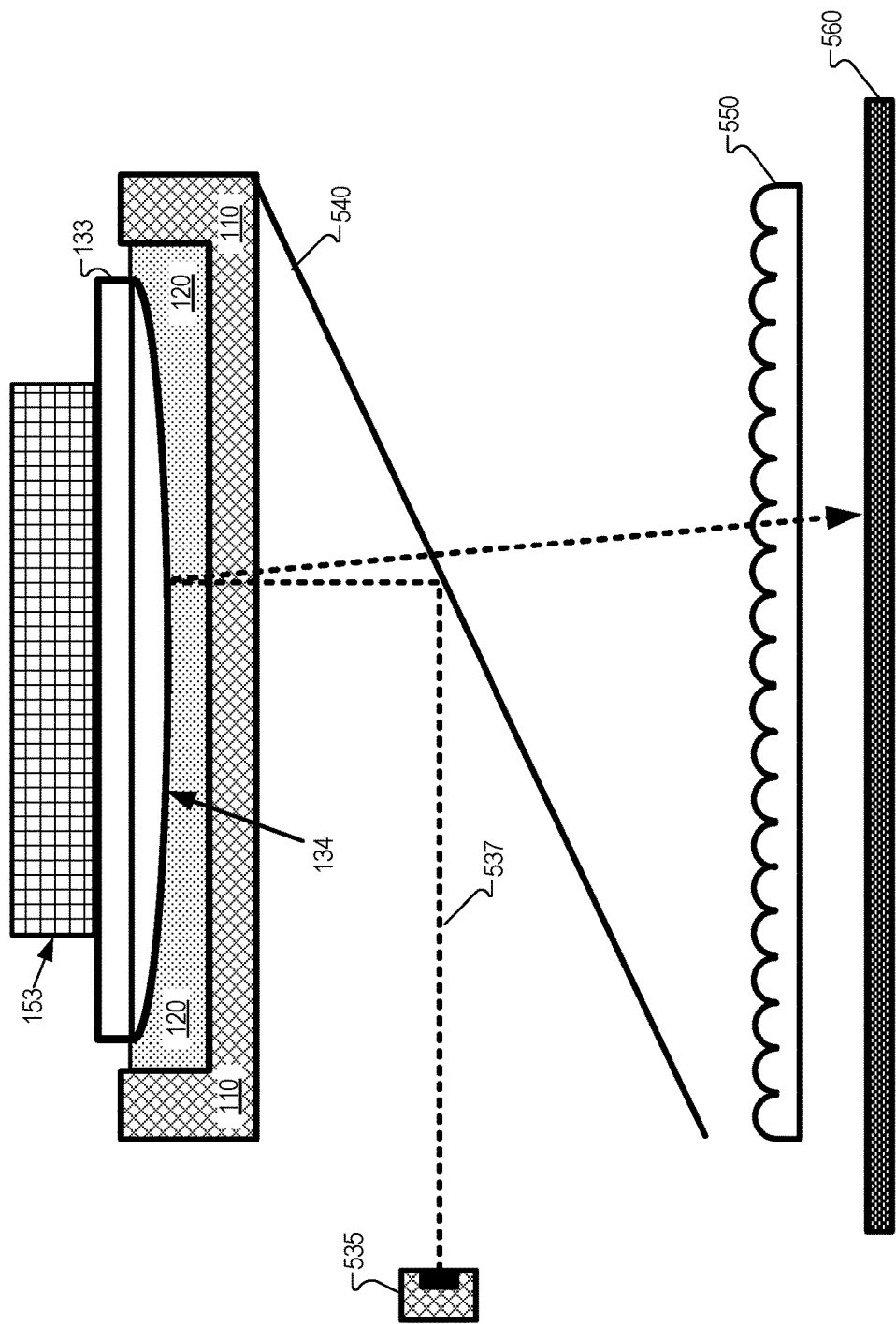
FIGS. 5A-5I illustrate a fabrication system that includes a deformable surface unit, a light source, and a lenslet array, in accordance with an embodiment of the disclosure.

FIG. 5A illustrates a fabrication system 500 that includes deformable surface unit 133, a transparent rigid portion 110, a source 535, a beam splitter 540, a lenslet array 550 and a photosensitive screen 560, in accordance with an embodiment of the disclosure. Fabrication system 500 may assist in facilitating closed-loop feedback for adjusting actuators of deformable surface unit 133 prior to a full curing of curable liquid 120.

In FIG. 5A deformable surface unit 133 is being driven to impart a selected surface profile onto deformable surface 134. In operation, deformable surface 134 is illuminated by illumination light emitted by one or more sources 535. In one embodiment, source 535 is a collimated light source emitting a collimated infrared beam as the illumination light. The illumination light propagates along optical path 537 and a portion of the illumination light reflects off of the beam splitter 540, propagates through rigid portion 110, through curable liquid 120, reflects off of deformable surface 134, propagates through curable liquid 120 (again), through rigid portion 110 (again), a portion of the illumination light propagates through beam splitter 540, through lenslet array 550, and finally becoming incident on photosensitive screen 560. Photosensitive screen 560 may be a complementary metal-oxide-semiconductor (CMOS) image sensor, for example.

Deformable surface 134 may be coated with a reflective surface that reflects the wavelength of the illumination light emitted by source 535. In one embodiment, the coating reflects near-infrared or visible light. Rigid portion 110 and curable liquid 120 are transparent to the band of the illumination light in FIG. 5A so that the illumination light can propagate through it. Beam splitter 540 may be a 50/50 beam splitter that reflects 50% of incident light and passes (transmits) the remaining portion of incident light. Lenslet array 550 and photosensitive screen 560 may be arranged as a Shack-Hartmann wavefront sensor. Lenslet array 550 may be a two-dimensional array of microlenses to focus the reflected illumination light onto photosensitive screen 560.

FIG. 5A only illustrates a single optical path 537 corresponding to a point of the deformable surface 134 for description purposes, but deformable surface 134 may be broadly illuminated with illumination light so that a majority or all of the two-dimensional deformable surface 134 is illuminated with illumination light that is reflected back onto photosensitive screen 560.

Figure 5B:
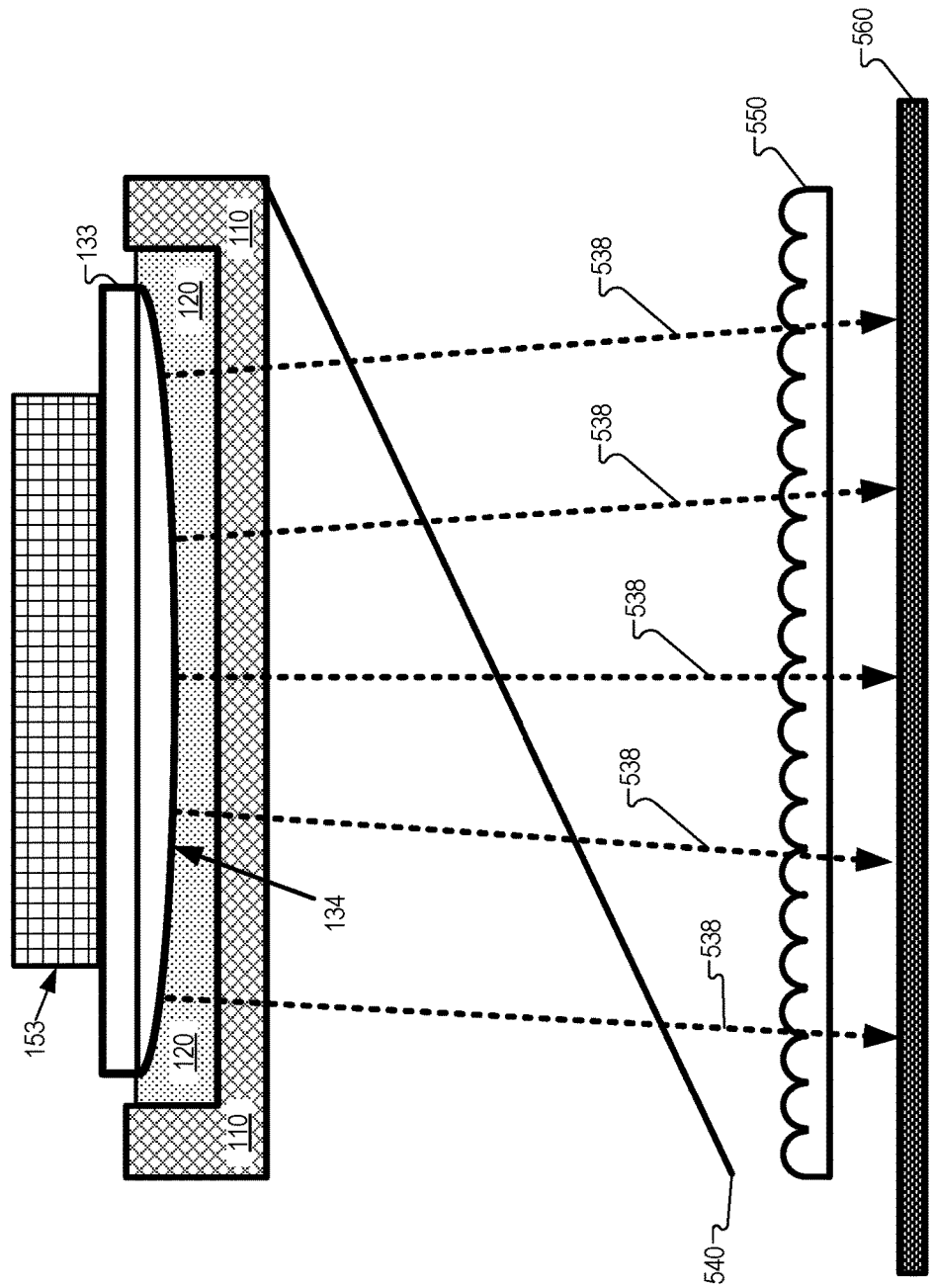

FIG. 5B illustrates photosensitive screen 560 receiving reflected illumination light 538 from many positions of deformable surface 134. In FIG. 5B, deformable surface 134 may be driven to have a radius of curvature of approximately 1000 mm. Although not illustrated, the reflected illumination light 538 is initially provided by one or more sources (e.g. 535) directing illumination light to deformable surface 134.

Figure 5D:
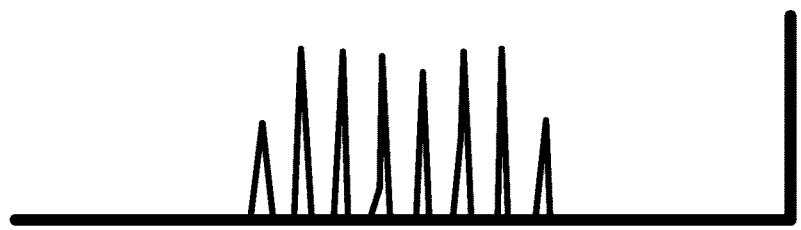
Figure 5C:
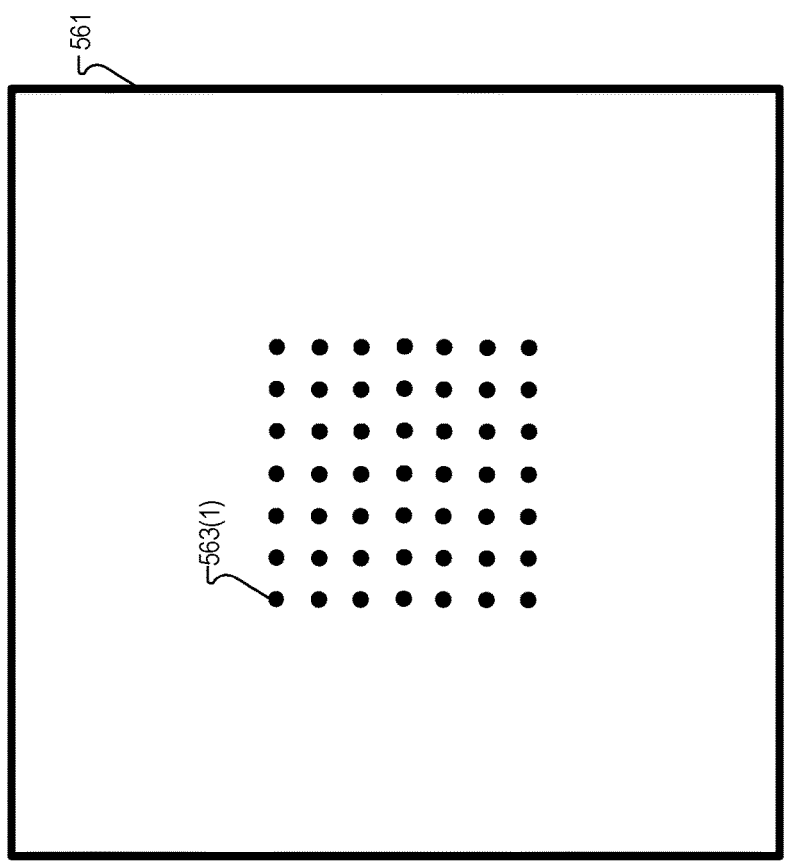
Figure 5E:
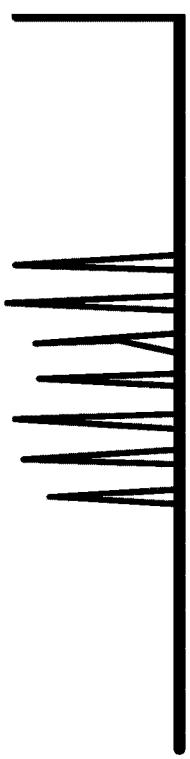

FIG. 5C illustrates an image 561 of the reflected illumination light 538 being focused on photosensitive screen 560. Image 561 may be captured by a CMOS image sensor, for example. FIG. 5D illustrates a chart of intensity values of image 561 with respect to vertical positions of the image 561. FIG. 5E illustrates a chart of intensity values of image 561 with respect to horizontal positions of the image 561. The position and intensity of the focused beams 563 of image 561 may be compared with the position and intensity of a calibrated image corresponding to a selected surface profile. The actuators in deformable surface unit 133 may be driven to resolve difference between the captured image 561 and the calibrated image corresponding to the selected surface profile. Subsequent images may be taken after the actuator(s) have been adjusted to compare with the calibrated image and subsequent adjustments to the actuators may be executed based on the subsequent images until the deformable surface 134 is within a specified engineering tolerance (determined by comparing the captured images to calibration data, for example).

Figure 5F:
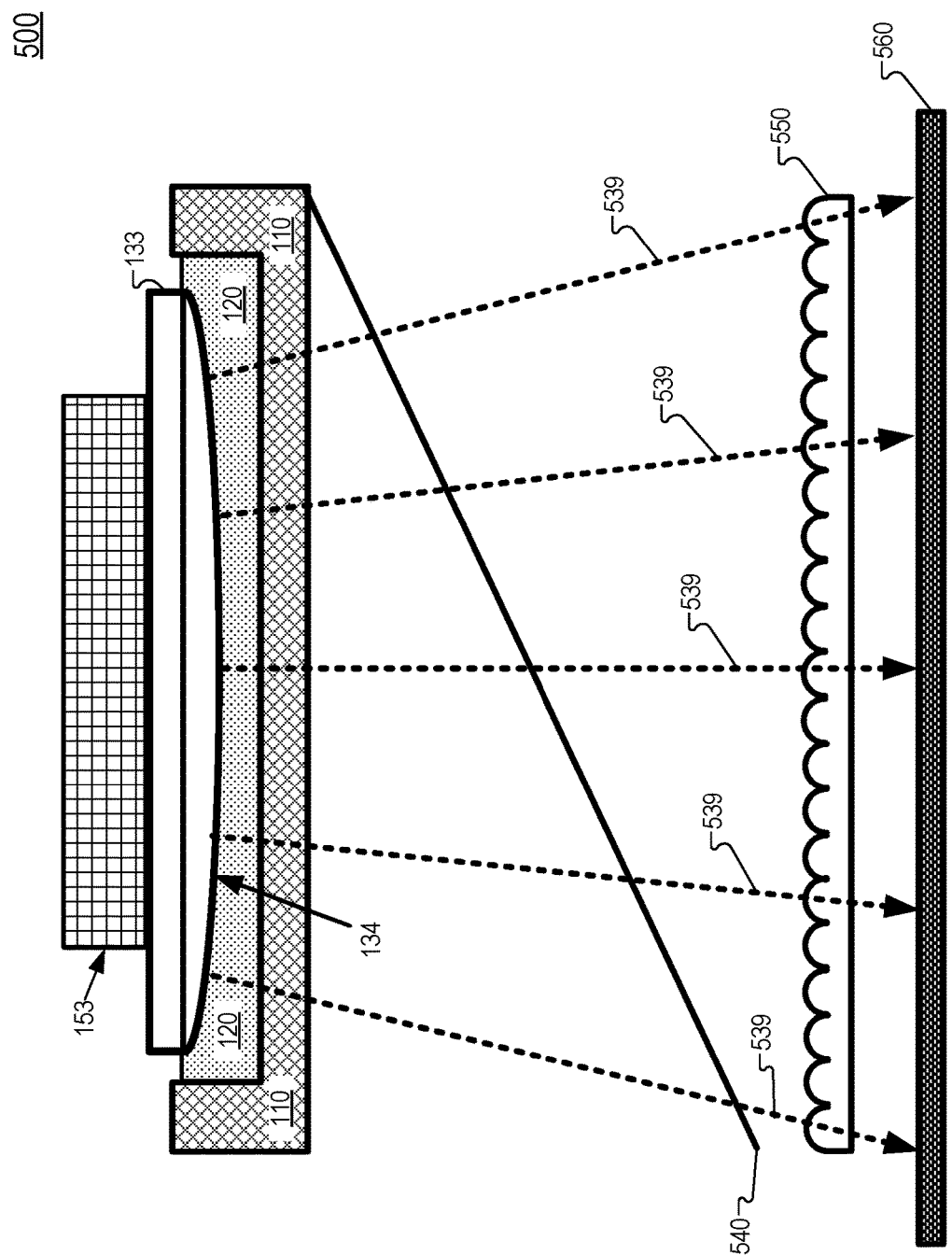

FIG. 5F is similar to FIG. 5B although deformable surface 134 is driven to a different selected surface profile that provides a wider spread of the reflected illumination light 539 than reflected illumination light 538. In FIG. 5F, deformable surface 134 may be driven to have a radius of curvature of approximately 750 mm. Although not illustrated, the reflected illumination light 539 is initially provided by one or more sources (e.g. 535) directing illumination light to deformable surface 134.

Figure 5H:
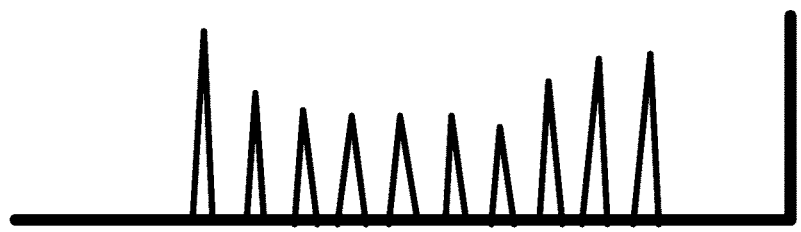
Figure 5G:
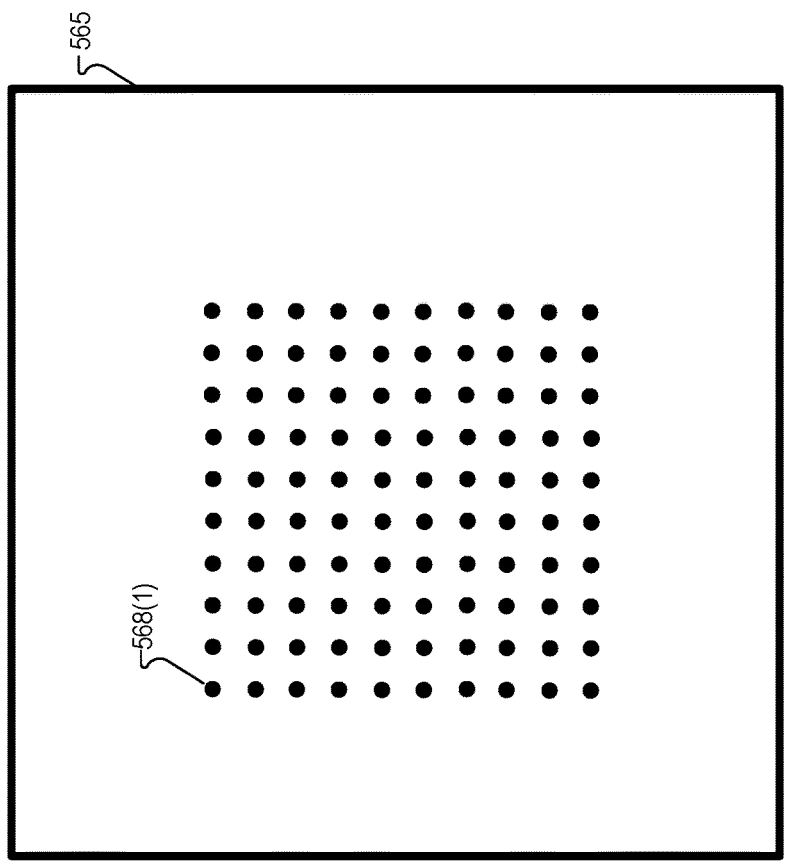
Figure 5I:
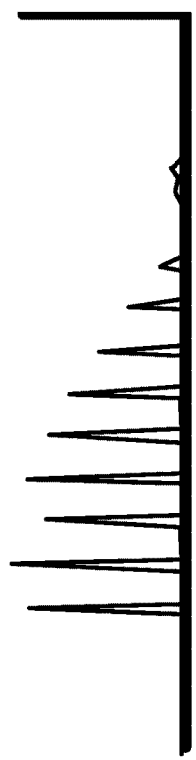

FIG. 5G illustrates an image 565 of the reflected illumination light 539 being focused on photosensitive screen 560. Image 565 may be captured by an image sensor disposed to capture images of photosensitive screen 560. FIG. 5H illustrates a chart of intensity values of image 565 with respect to vertical positions of the image 561. FIG. 5I illustrates a chart of intensity values of image 565 with respect to horizontal positions of the image 565. The position and intensity of the focused beams 568 of image 565 may be compared with the position and intensity of a calibrated image corresponding to a selected surface profile. The actuators in deformable surface unit 133 may be driven to resolve difference between the captured image 565 and the calibrated image corresponding to the selected surface profile. Subsequent images may be taken after the actuator(s) have been adjusted to compare with the calibrated image and subsequent adjustments to the actuators may be executed based on the subsequent images until the deformable surface 134 is within a specified engineering tolerance.

There are more focused beams 568 in image 565 than focused beams 563 in image 561 since the more widely reflected illumination light 539 encountered a greater number of microlenses in lenslet array 550 than the narrower reflected illumination light 538.

Figure 6:
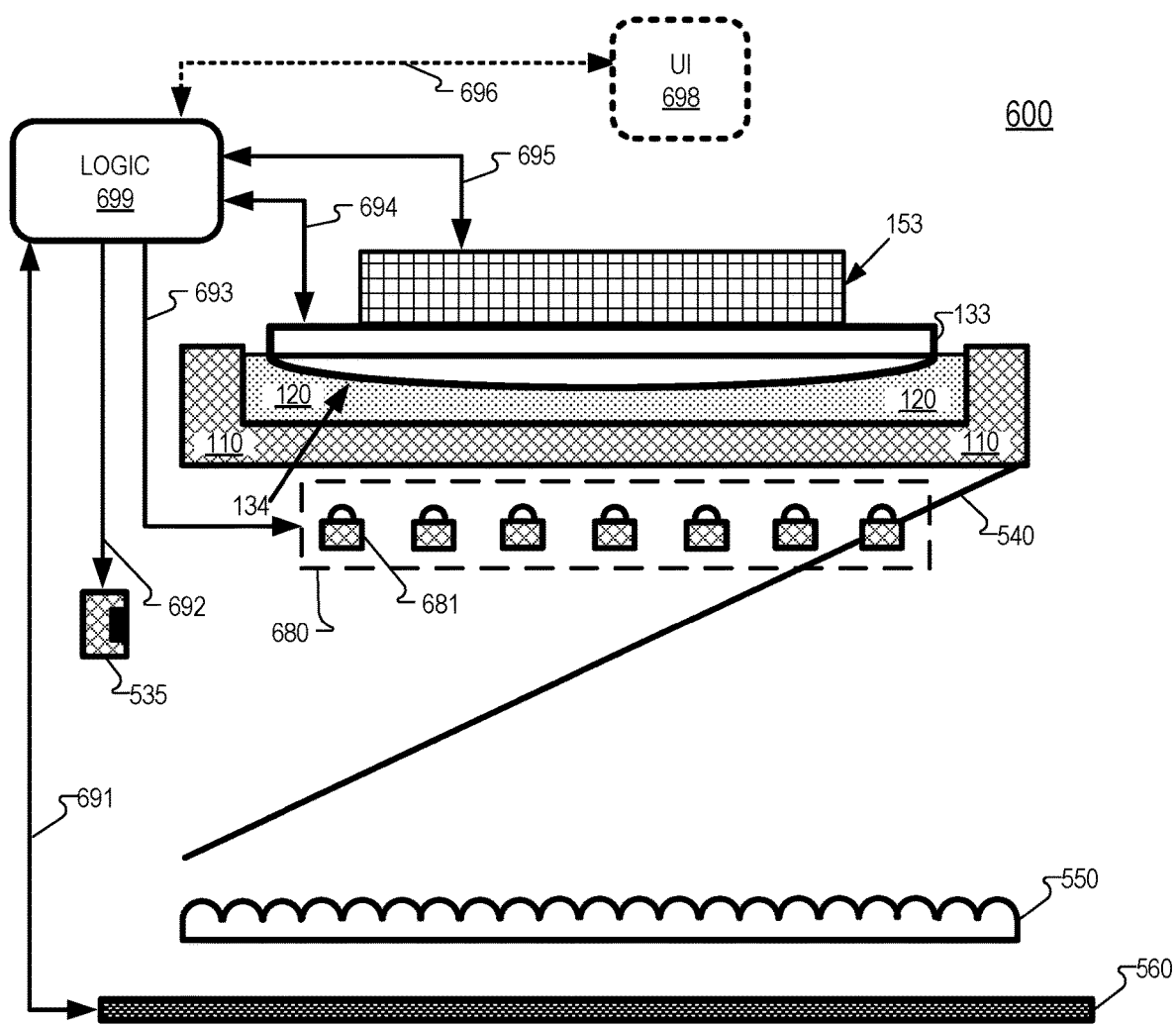
FIG. 6 illustrates a system that includes processing logic configured to receive images and drive actuators of a deformable surface unit in response to receiving the images, in accordance with an embodiment of the disclosure.

FIG. 6 illustrates a system 600 that includes processing logic 699 configured to receive images from photosensitive screen 560 and drive actuators of deformable surface unit 133 in response to receiving the images, in accordance with an embodiment of the disclosure. In FIG. 6, processing logic 699 is coupled to photosensitive screen 560 via communication channel 691. Processing logic 699 may send photosensitive screen 560 a capture signal to capture an image and photosensitive screen 560 may provide logic 699 with image data of captured images. Processing logic 699 is coupled to drive source(s) 535 to emit illumination light via communication channel 692. Optionally, processing logic 699 may be coupled to a user interface 698 via communication channel 696 that may include a keyboard, mouse, and/or display, for example. Although not illustrated, processing logic 699 may include an internal memory or processing logic 699 may be communicatively coupled with a separate memory external to processing logic 699. The memory may store surface profiles and calibration data associated with the surface profiles.

Processing logic 699 is coupled to drive an array of radiation sources 680 via communication channel 693. Each radiation source 681 in the array 680 may be individually drivable by processing logic 699. Processing logic 699 may drive each radiation source 681 by way of an analog signal or digital signal. If the radiation sources 681 are light sources, processing logic 699 may drive them to different emission levels to emit different intensities of light used to cure the curable liquid 120. If the radiation source 681 is a heat source, processing logic 699 may drive them to different power levels to produce different levels of heat used to cure the curable liquid 120. The radiation sources 681 in FIG. 6 are not necessarily disposed to impede the optical path of reflected illumination light reflecting off deformable surface 134. The radiation sources 681 may be distributed in a ring around the deformable surface 134, for example. The radiation sources 681 may be disposed on the sides of rigid portion 110 or closer to platform 153. Radiation sources 681 may be disposed in a two-dimensional array (e.g. a 10×10 matrix of ultraviolet LEDs), for example.

In one embodiment (not illustrated), radiation sources 681 are replaced by a UV source that illuminates a mask. The mask includes holes or transparent voids that are sized to locally control UV radiation to different areas of the curable liquid 120. In some embodiments, the mask is a grayscale photomask that includes varying transparency corresponding to different locations of the grayscale photomask. Varying the transparency of the photomask allows for modulation of intensity of the UV radiation that is incident on different areas of curable liquid 120.

Processing logic 699 is coupled to drive the actuators (not illustrated) of deformable surface unit 133 via communication channel 694. In this way, processing logic 699 may drive a selected surface profile onto the deformable surface 134. Processing logic 699 may also be coupled to drive the stage that includes platform 153 (and extensions 151 and 152) via communication channel 695. The stage may be driven to a particular position in order to properly imprint surface 134 into curable liquid 120.

While FIG. 6 generally illustrates a Shack Hartmann wavefront sensor configuration, a Reverse Hartmann Shack wavefront sensor configuration could also be utilized. A Reverse Hartmann Shack configuration would include a structured light source such as an array of point sources or fringe patterns being projected onto the deformable surface. A camera would then capture an image of the projected point sources or fringe patterns and processing logic could analyze the images to determine the surface shape of the deformable surface. In another configuration, a polarized light source illuminates the deformable surface and polarization sensitive camera captures images of the deformable surface. The images captured by the polarization sensitive camera can then be analyzed to monitor birefringence changes of the polymer over the curing cycle. An intensity of the radiation sources 681 may be modulated regionally or globally to control the curing rate to select the preferred birefringence of the polymer.

Figure 7:
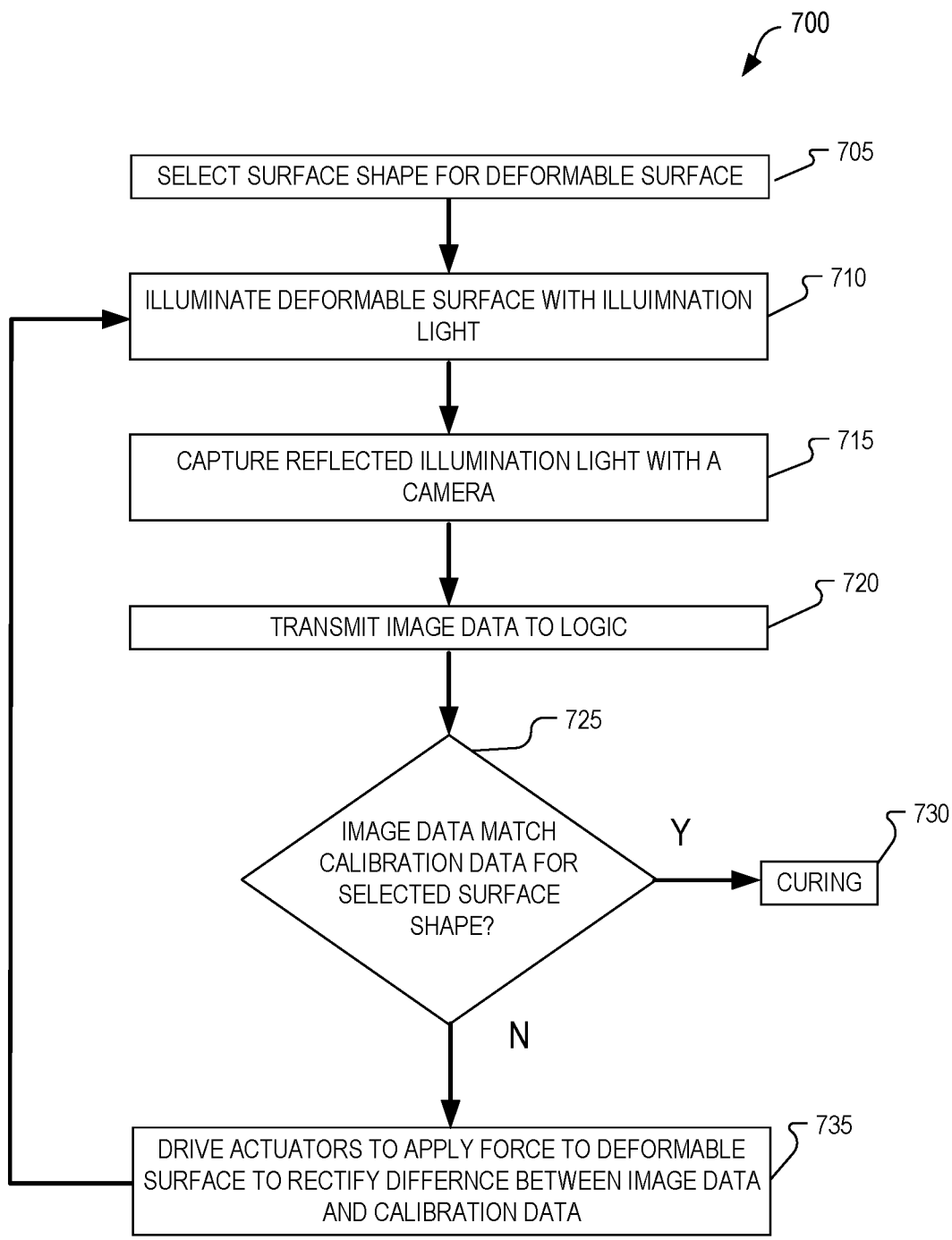
FIG. 7 illustrates a flow chart of an example process of deformable surface control for fabricating optical elements, in accordance with an embodiment of the disclosure.

FIG. 7 illustrates a flow chart of an example process 700 of deformable surface control for fabricating optical elements, in accordance with an embodiment of the disclosure. The order in which some or all of the process blocks appear in process 700 should not be deemed limiting. Rather, one of ordinary skill in the art having the benefit of the present disclosure will understand that some of the process blocks may be executed in a variety of orders not illustrated, or even in parallel. Process 700 may be performed by processing logic 699 and system 600, for example.

In process block 705, a surface shape for a deformable surface is selected. The surface shape may be derived from a surface profile among an array of surface profiles that are stored in a memory accessible to processing logic 699, for example.

In process block 710, the deformable surface is illuminated with illumination light. In some embodiments, processing logic 699 may drive one or more illumination sources (e.g. 535) to illuminate the deformable surface. The deformable surface may be illuminated by reflections off of a beam splitter (e.g. 540), in some embodiments.

In process block 715, reflected illumination light (e.g. 538 or 539) is captured by a camera (e.g. a camera including a CMOS image sensor where a CMOS image sensor is the photosensitive screen 560). Capturing the illumination light may include capturing an image of photosensitive screen 560, in some embodiments. Processing logic 699 may transmit a capture signal to the photosensitive screen 560 to initiate an image capture, for example. An image including the image data of the reflected illumination light may be sent to processing logic 699, in process block 720.

Image data (e.g. image 561 or 565) from the image captured by the camera is compared with calibration data for the selected surface shape. Comparing the image data to the calibration data may include comparing the positions of focused beams (e.g. 563 or 568) in an image to the calibration data. The calibration data may include an image of a surface that is known to have the surface shape of the selected surface shape. In process block 725, if the image data matches the calibration data within a pre-determined engineering tolerance(s), process 700 may proceed to a curing stage of process block 730. In the curing stage of process 700, radiation sources may be driven to cure the curable liquid since the deformable surface is properly positioned according to the selected surface shape. In some embodiments, process 700 is on-going while the radiation sources are being driven to cure the curable liquid. If the image data does not match the calibration data within the pre-determined engineering tolerance(s), process 700 may proceed to process block 735.

In process block 735, the actuators of the deformable surface unit are driven to apply force to the deformable surface to rectify or resolve the difference between the image data and the calibration data. Processing logic 699 may drive the actuators of deformable surface unit 133 in response to receiving the image data from photosensitive screen 560 and comparing the image data to calibration data accessible to processing logic 699. Process 700 may return to process block 710 after executing process block 730. Process 700 may continue iterating through process blocks 710 through 730 until the image data of the deformable surface matches the calibration data to within a pre-determined acceptable engineering tolerance.

In some embodiments of the disclosure, processing logic 699 may individually drive radiation sources 681 in response to receiving the image data from photosensitive screen 560. The radiation levels of individual radiation sources may be individually driven up or down. This may facilitate a localized micro-dosing of radiation to accelerate or decelerate the curing of curable liquid 120 with increased granularity. This may assist in evenly controlling the temperature, for example. In some embodiments, additional optical layers may be immersed in curable liquid 120 that are sensitive to heat and thus a localized and granular means of controlling the heat may assist in evenly curing an optical element such as optical element 199 without overheating a local area.

Figure 8:
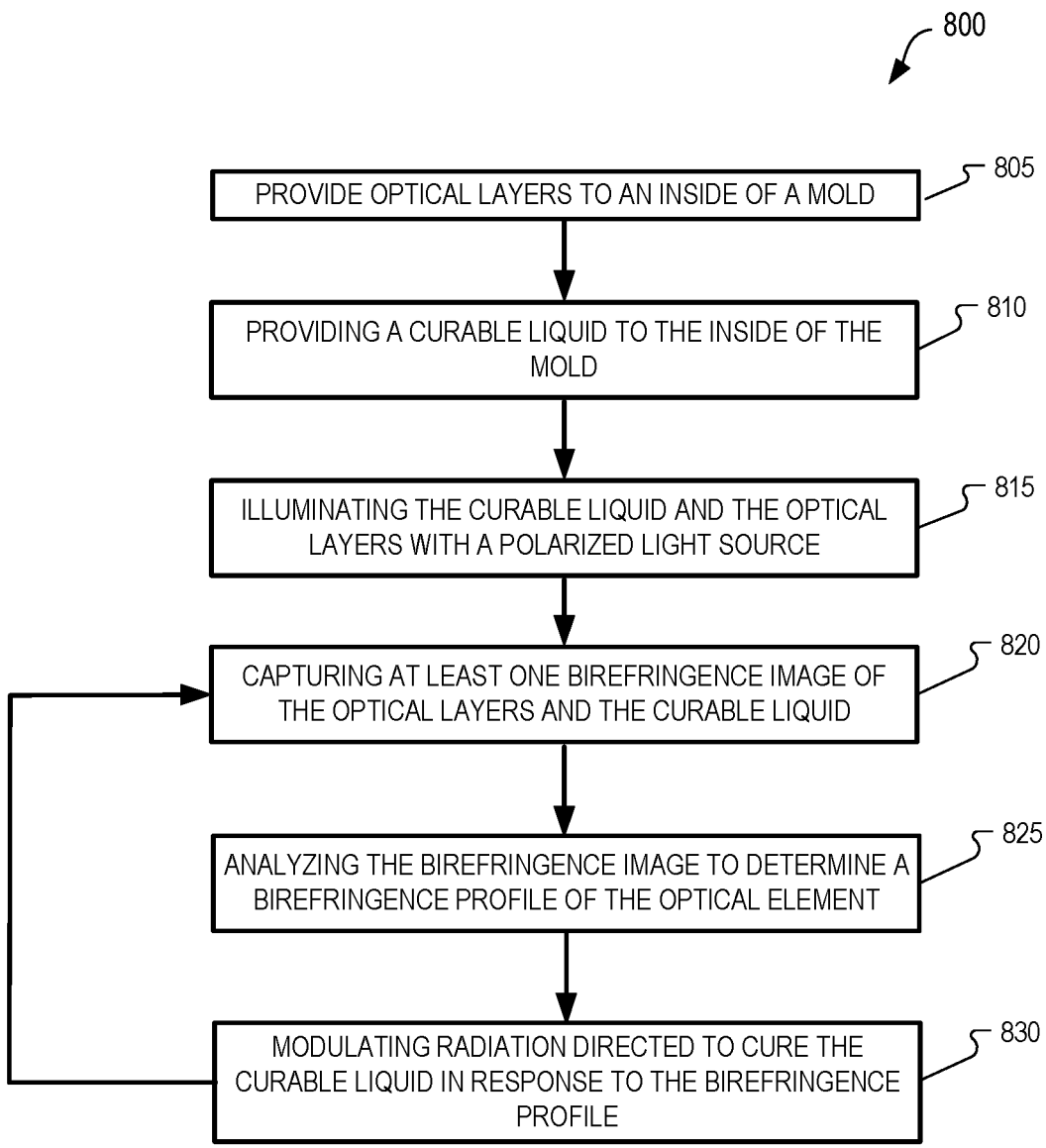
FIG. 8 illustrates a flow chart of an example process of sensing birefringence in an optical element during fabrication, in accordance with an embodiment of the disclosure.

FIG. 8 illustrates a flow chart of an example process 800 of sensing birefringence in an optical element during fabrication, in accordance with an embodiment of the disclosure. The order in which some or all of the process blocks appear in process 800 should not be deemed limiting. Rather, one of ordinary skill in the art having the benefit of the present disclosure will understand that some of the process blocks may be executed in a variety of orders not illustrated, or even in parallel.

In the fabrication of some optical elements, optical layers including polarizing films and/or waveplates may be included in the mold prior to providing the curable liquid. These optical layers may be sensitive to heat and the performance of the fabricated optical element is dependent on the polarizing properties imparted by the polarizing films and/or waveplates.

In process block 805, optical layers are provided to the inside of a mold. In process block 810, a curable liquid is provided to the inside of the mold. The curable liquid contacts the optical layers. Some of the optical layers may be already bonded together in an "optical stack."

In process block 815, the curable liquid and the optical layers are illuminated by a polarized light source. The polarized light source may emit polarized infrared light.

In process block 820, at least one birefringence image is captured of the optical layers and the curable liquid. The at least one birefringence image is captured by a polarization-sensitive camera receiving a reflection of the polarized light (from the optical element being fabricated) that was emitted by the polarized light source. The photosensitive camera may also only be sensitive to the wavelength of the polarized light source.

In process block 825, the captured birefringence image or images are analyzed to determine a birefringence profile of the optical element that is being fabricated where the optical element includes the curable liquid and the optical layers. The birefringence profile may be a two-dimensional image showing a two-dimensional mapping of the optical element and the corresponding polarization orientations of different positions in the mapping.

In process block 830, radiation directed to cure the curable liquid is modulated in response to the birefringence profile. Modulating the radiation may include driving a plurality of ultraviolet light sources to different emission levels where the ultraviolet light sources in the plurality are disposed in close proximity to the mold. The emission level of each ultraviolet light source in the plurality can be individually controlled, in one embodiment. In one embodiment, modulating the radiation may include driving a plurality of heat sources to different power levels where the heat sources in the plurality are disposed in close proximity to the mold. The power level of each heat source in the plurality can be individually controlled, in one embodiment. The modulation of the radiation can be either global (adjustment to all radiation sources) or local (modulation of individual radiation sources).

After the modulation of the radiation in process block 830, process 800 may return to process block 820 to capture additional birefringence images to determine a change in birefringence of the optical element in response to the radiation modulation. Process 800 may iterate through process blocks 820, 825, and 830 until the birefringence profile matches a calibrated birefringence profile of a master optical element.

System 600 may be modified to perform process 800, in some embodiments. In particular, source 535 would be modified to a polarized light source or a polarization film would be disposed over an emission aperture of source 535. Additionally, photosensitive screen 560 embodied as an image pixel array may have a polarization layer disposed over it to form a polarization-sensitive camera. With these modifications, processing logic 699 of system 600 may perform process 800.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. 699) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Communication channels 691, 692, 693, 694, 695, and 696 may include or be routed through one or more wired or wireless communication utilizing IEEE 802.11 protocols, BlueTooth, SPI (Serial Peripheral Interface), I$^2$C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of fabricating an optical element, the method comprising:
   providing a curable liquid to a mold, wherein the mold includes a rigid surface disposed opposite a deformable surface, and wherein the curable liquid contacts the rigid surface and the deformable surface;
   shaping the deformable surface according to a surface profile by driving a plurality of actuators that are configured to move the deformable surface, wherein first ones of the plurality of actuators are oriented around edge of the deformable surface and are oriented at a first angle with respect to the rigid surface, wherein second ones of the plurality of actuators are oriented at a second angle with respect to the rigid surface, wherein the first ones of the plurality of actuators are configured to provide one or more lowest-order Zernike terms of a Zernike polynomial that define the surface profile of the optical element at least partially based on an orientation of the first ones of the plurality of actuators, wherein the second ones of the plurality of actuators are configured to provide one or more highest-order Zernike terms of the Zernike polynomial, which adjusts a resolution of the surface profile of the optical element; and
   curing the curable liquid while the deformable surface is shaped according to the surface profile.

2. The method of claim 1, wherein curing the curable liquid includes exposing the curable liquid to ultraviolet radiation, and wherein the rigid surface is formed of material that is transparent to the ultraviolet radiation, the ultraviolet radiation propagating through the material before becoming incident on the curable liquid.

3. The method of claim 2, wherein the material of the rigid surface of the mold is made from glass or plastic.

4. The method of claim 1, wherein curing the curable liquid includes heating the curable liquid for a curing time period.

5. The method of claim 1, wherein the deformable surface is included in a membrane of a fluid lens.

6. The method of claim 1, wherein the first ones of the plurality of actuators apply and withdraw pressure to the deformable surface along an edge of the deformable surface, and wherein the plurality of actuators include at least one of a piezoelectric actuators, electrostrictive actuators, or magnetic actuators.

7. The method of claim 1 further comprising:
   capturing an image of the deformable surface while the curable liquid is in the mold; and
   adjusting the plurality of actuators in response to the image prior to the curable liquid fully curing.

8. The method of claim 7, wherein capturing the image includes illuminating the deformable surface with illumination light that propagates through the rigid surface and through the curable liquid.

9. The method of claim 8, wherein capturing the image includes an image sensor receiving the illumination light through a lenslet array subsequent to the illumination light reflecting off of the deformable surface.

10. The method of claim 1, wherein curing the curable liquid includes driving a plurality of ultraviolet light sources to different emission levels, wherein the ultraviolet light sources in the plurality are disposed in close proximity to the mold, and wherein the emission level of each ultraviolet light source in the plurality can be individually controlled.

11. The method of claim 1, wherein curing the curable liquid includes driving a plurality of heat sources to different power levels, wherein each heat sources in the plurality of heat sources is disposed in close proximity to the mold, and wherein the power level of each heat source in the plurality of heat sources can be individually controlled.

12. The method of claim 1, wherein the deformable surface includes a coating that reflect ultraviolet radiation and transmits visible and near-infrared wavelengths.

13. The method of claim 1, wherein the deformable surface includes a coating that reflects near-infrared wavelengths.

14. The method of claim 1, wherein curing the curable liquid includes illuminating a mask with ultraviolet (UV) radiation emitted from a UV source, and wherein the UV radiation propagating through the mask becomes incident on the curable liquid.

15. The method of claim 1, wherein the rigid surface includes a two-dimensional curvature.

16. A fabrication system for an optical element, comprising:
   a mold having a void for filling with a curable liquid, wherein the void includes a rigid surface;
   a deformable membrane configured to press into the curable liquid when the void is filled with the curable liquid;
   a plurality of actuators configured to impart a surface profile to the deformable membrane, wherein first ones of the plurality of actuators are oriented around an edge of the deformable membrane, wherein the first ones of the plurality of actuators are configured to provide one or more lowest-order Zernike terms of a Zernike polynomial that defines the surface profile of the optical element at least partially based on an orientation of the first ones of the plurality of actuators, wherein
   second ones of the plurality of actuators are oriented at a non-zero angle with respect to the first ones of the plurality of actuators, wherein the second ones of the plurality of actuators are configured to provide one or more highest-order Zernike terms of the Zernike polynomial, which adjusts a resolution of the surface profile of the optical element; and
   at least one radiation source configured to provide radiation that accelerates a curing time period of the curable liquid in the mold.

17. The fabrication system of claim 16 further comprising:
   a stage coupled to the deformable membrane, wherein the stage is configured to press the deformable membrane into the void after the void is filled with the curable liquid.

18. The fabrication system of claim 16 further comprising:
   a collimated light source configured to emit a collimated beam to be reflected by the deformable surface, wherein the deformable surface includes a reflecting layer that reflects a wavelength band of the collimated beam; and
   an image sensor configured to capture an image of the collimated beam reflecting off of the deformable surface.

19. The fabrication system of claim 18 further comprising:
   processing logic configured to receive the image from the image sensor, wherein the processing logic is configured to drive the plurality of actuators of the deformable membrane in response to receiving the image.

20. The fabrication system of claim 18 further comprising:
   a lenslet array configured to focus the collimated beam reflecting off of the deformable membrane.

* * * * *